United States Patent [19]
Ozaki

[11] 4,046,025
[45] Sept. 6, 1977

[54] BICYCLE SPEED CHANGE LEVER DEVICE

[75] Inventor: Nobuo Ozaki, Osaka, Japan

[73] Assignee: Maeda Industries, Ltd., Osaka, Japan

[21] Appl. No.: 693,128

[22] Filed: June 4, 1976

[30] Foreign Application Priority Data

July 11, 1975 Japan .............................. 50-96869[U]
June 7, 1975 Japan .............................. 50-77156[U]

[51] Int. Cl.² .............................................. G05G 5/18
[52] U.S. Cl. .................................... 74/501 R; 74/489
[58] Field of Search ..................... 74/501 R, 489, 495, 74/531, 487

[56] References Cited
U.S. PATENT DOCUMENTS

| | | | |
|---|---|---|---|
| 2,237,581 | 4/1941 | Schwinn | 74/489 |
| 3,181,391 | 5/1965 | Juy | 74/501 X |
| 3,478,617 | 11/1969 | Maeda | 74/489 |
| 3,759,114 | 9/1973 | De Four | 74/489 |

*Primary Examiner*—Clarence R. Gordon
*Attorney, Agent, or Firm*—Birch, Stewart, Kolasch and Birch

[57] ABSTRACT

A bicycle speed change lever device is combined with a fixing band having a pair of expandable open ends, wherein at least one inside nut holding means is formed with the open ends of the fixing band for supporting an inside nut. A cup member is mounted to the fixing band so as to receive the inside nut holding means in order to eliminate external projections with the fixing band. A lever handle is movably mounted on the cup member and a threaded shank passes through the cup member and the lever handle in engagement at its inner end with the inside nut.

11 Claims, 6 Drawing Figures

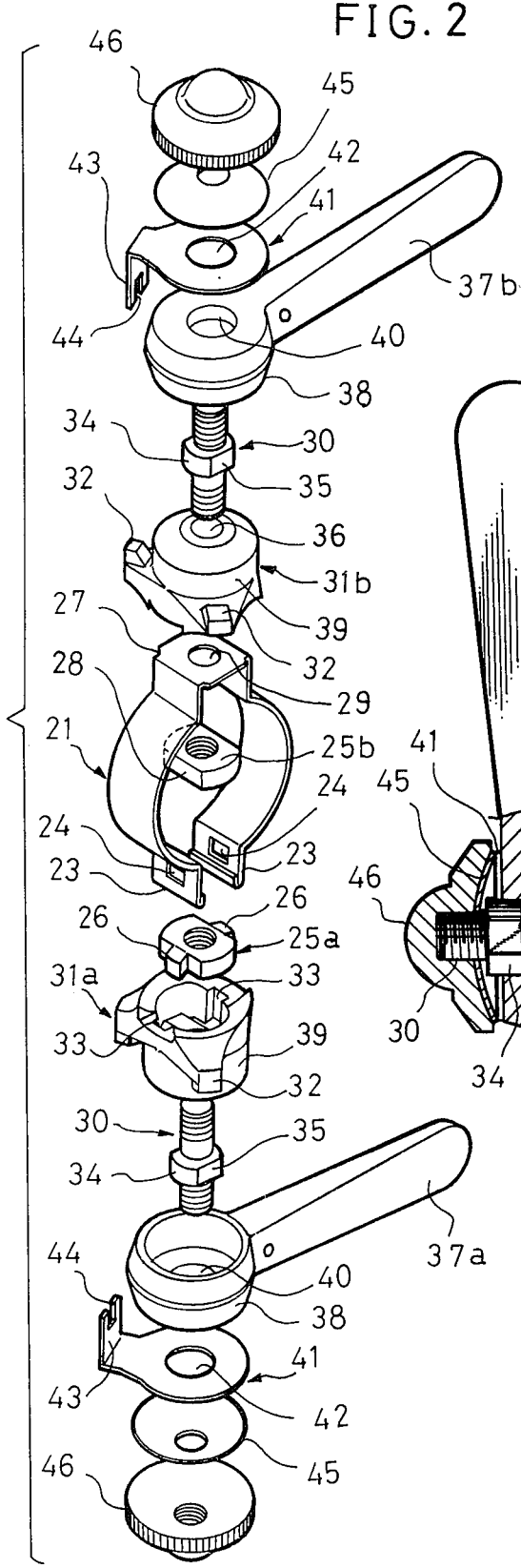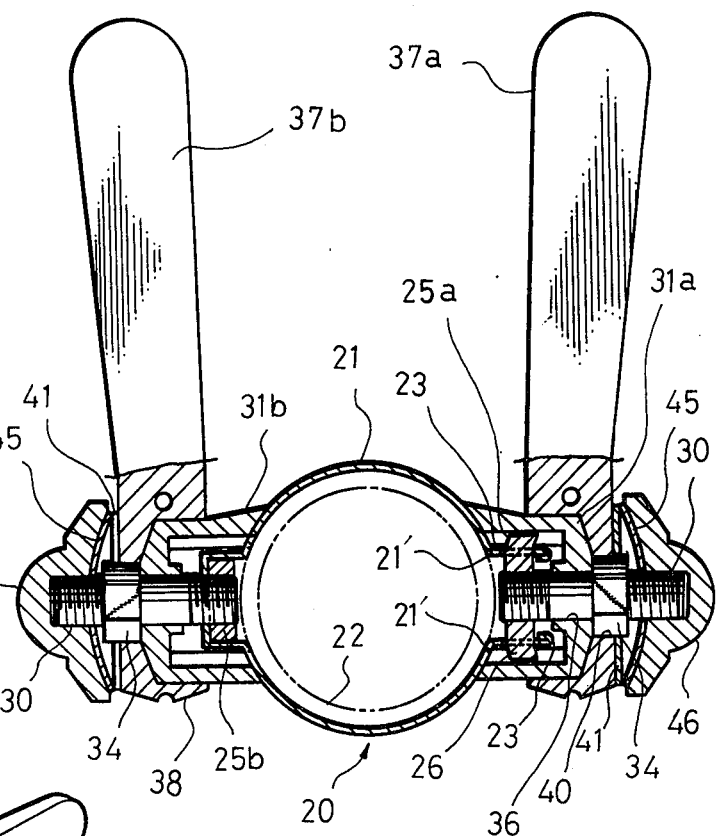

BICYCLE SPEED CHANGE LEVER DEVICE

BACKGROUND AND SUMMARY OF THE INVENTION

The present invention relates to a speed change lever device of a bicycle, and more particularly to an improvement in a combination of a bicycle speed change lever with a fixing band with which the change lever is secured to a bicycle frame tube.

It is customary to mount a speed change lever device, single handle type or double (twin) handle type, onto a bicycle frame tube by means of a known fixing band as illustrated in FIG. 6 presenting a typical model of prior art bicycle speed change lever device. More particularly, each of known type lever fixing bands 10 has a pair of opposite ears 11 with a respective eye 12 through which a clamping screw 13 is inserted. A pair of lever handles 14 are movably mounted on each of a pair of lever seats 15 which are integrally secured at sides to the fixing band 10, which is clamped onto a bicycle frame tube 16 (shown in phantom line) by tightening a screw 13 in cooperation with a mating nut 17 provided at one of the pair of opposite ears 11. Thus, the ears 11 of the conventional band 10 are exposed externally and project outwardly when applied to a bicycle frame. Such projecting ears 11 are not only good in appearance but also dangerous in use because they occasionally catch a user's clothing or the like.

The present invention contemplates an improvement over the conventional types of bicycle speed change lever devices having a known fixing band. According to the present invention, the projecting ears of the fixing band are not exposed externally.

It is, therefore, a principal object of the present invention to provide an improved combination of a bicycle speed change lever with a fixing band without ears projecting externally.

The above and other objects, features and advantages of the present invention will become more apparent from the following description of some of the preferred embodiments thereof taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is an enlarged front elevational view partly in section, illustrating one embodiment according to the present invention;

FIG. 2 is a reduced exploded perspective illustration showing the main structural parts of the embodiment shown in FIG. 1;

DESCRIPTION OF THE PREFERRED EMBODIMENTS

Figure 3:
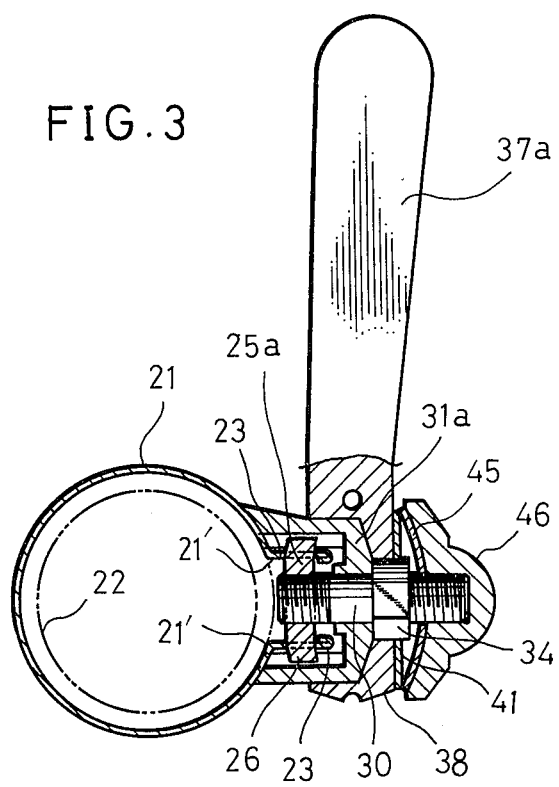
FIG. 3 is an enlarged front elevational view partly in section, illustrating a modified embodiment according to to present invention.
Figure 6:
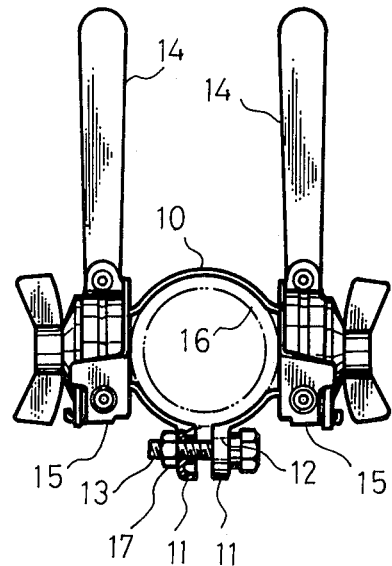
FIG. 6 is a reduced front elevation with a part broken away, illustrating a typical example of prior art double handle type device having a conventional fixing hand with a pair of projecting ears.

Referring now by reference numerals to the drawings, and first in particular to FIGS. 1 and 2, the speed change lever device 20 according to the present invention has a fixing band 21 with which the device 20 is mounted on a bicycle frame tube 22. Said fixing band 21 has a pair of open ends 21' which are elastically expandable, with said open ends 21' being formed by a first inside nut holding means in the form of a pair of spaced ears 23 with a substantially square opening 24 formed therein. A first inside nut 25a is provided which has a small projection 26 on each of either sides. The nut 25a is interposed between said spaced ears 22 with the projections 26 engaged in said square opening 24. At the opposite place to said open ends 21', a second inside nut holding means in the form of a channel-shaped casing 27 is integrally formed to receive therein a second inside nut 25b with at least a pair of flat side surfaces 28. The nut 25b is prevented from turning within the casing 27 because the flat side surfaces 28 cooperate with the vertical walls of the casing 27.

In the top wall of said casing 27, a hole 29 is formed to provide a passage for a threaded shank 30 to be hereinafter described. Further, a pair of first and second cup members 31a, 31b are provided, each of which has a same outer configuration of substantially cylindrical shape with a holed top wall, having at least one projection 32 on the periphery adjacent the bottom thereof. The first cup member 31a is formed with an internal space capable of receiving the pair of ears 23 with the nut 25a engaged therewith in the manner as described above. The cup member 31a is further formed with a pair of internal slots 33 which are engageable with the pair of projections 26 of the nut 25a. The second cup member 31b is likewise formed with an internal space which permits receiving the casing 27 therein. In this connection, it will be easily understood that, if the size of the casing 27 is defined to be substantially equal to the height, width and distance of the pair of ears 23, the cup members 31a and 31b are replaceable with each other, though the slots 33 are useless when the cup member 31a is employed to receive the casing 27. Further, a pair of shanks 30 are provided, each of which has both ends threaded, and a flange 34 with a pair of flat sides 35 is formed in intermediate position with each of the shanks 30. The flat sides 35 provide surfaces engageable with a wrench or a spanner.

In assembly, the band 21 is first mounted onto a bicycle frame tube 22 by forcibly expanding the distance of the pair of spaced ears 23 which are elastic. Then, the nut 25a is interposed between the pair of ears 23 with its small projections 26 in each of the square openings 24 and the second inside nut 25b is received within the casing 27. After that, the first cup member 31a is mounted so that its bottom wall is in contact with the outer surface of the band 21 in such a manner that the ears 23 and the nut 25a are housed within the cup member 31a. At the next step, the one threaded shank 30 is inserted through a passage (FIG. 1) of the cup member 31a to be screwably engaged with the nut 25a. The internal diameter of the passage 36 is smaller than the external diameter of said flange 34 of the shank 30. A first lever handle 37a having an annular portion 38 is mounted on the cup member 31a, so that the former 37a can be moved about the latter 31a. The annular portion 38 has an internal diameter which substantially corresponds to the outer diameter of the cylindrical portion 39 of the cup members 31a, 31b. The annular portion 38 is formed with a bore 40 of a diameter substantially equal to the maximum external diameter of the flange 34 of the shank 30. Then, an annular plate 41 is disposed on the outer surface of the annular portion 38, with the flange 34 of the shank 30 being inserted within a center bore 42 of the plate 41. The plate 41 has a wall 43 which extends inwardly in the axial direction and is formed with a square notch 44 therein. The wall 43 is arranged so that said notch 44 is engaged with the projection 32 of the cup member 31a for restricting the turning of the cup member 31a. A washer, preferably a spring washer 45, is provided on the outer surface of said annular plate 41, said finally an outside lock nut, preferably in the form of a cap nut 46 as illustrated, is screwed onto the outer threaded end of the shank 30.

The other cup member 31b is also mounted substantially in the same manner as with said first cup member 31a, except that the member 31b houses the casing 27 with the second nut 25b therein and the threaded shank 30 is engaged with said nut 25b. It is obvious that the second lever handle 37b is also assembled in the same manner as described in the foregoing.

In operation, when the alternative one of the flanges 34 of the two shanks 30 incorporated in the device 20 is turned in one direction with a wrench or a spanner, the alternative of the nut 25a or the nut 25b is forced to move outwardly together with the ears 23 or the casing 27. As a result, the band 21 holds the bicycle frame tube 22 tightly. Thus, the change lever device 20 is firmly secured to the bicycle frame. In use, by tightening the cap nut 46, the pressure is applied to the annular portion 38 of the lever handles 37a, 37b, through the spring washer 45 and the annular plate 41. Therefore, by adjusting the pressure by means of the lock nut 46, the lever handles 37a or 37b can be supported in an appropriate frictional condition.

FIG. 3 illustrates a single handle type modification which is easily derived from the embodiment as described in the foregoing with reference to FIGS. 1 and 2. The construction thereof is the same as that of the right half in FIG. 1 or the lower half in FIG. 2. Thus, it is considered that the detailed explanation is unnecessary.

Figure 4:
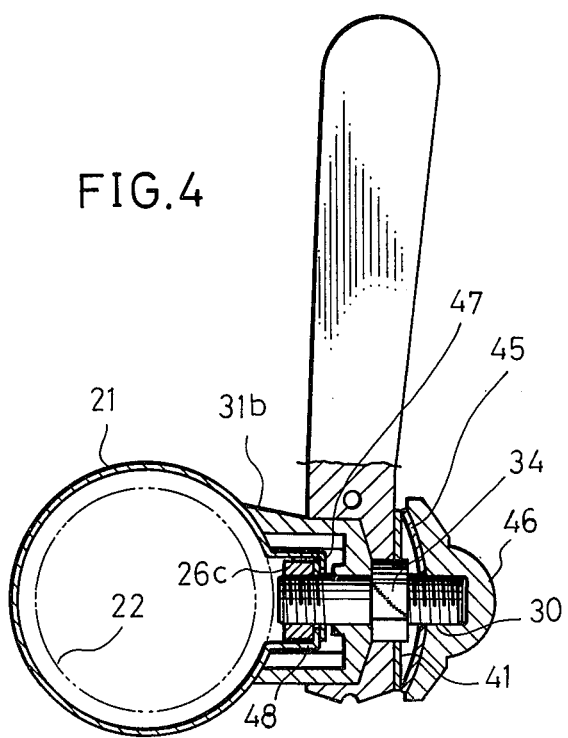
FIG. 4 is a similar view to FIG. 6, showing a further modification of the present invention.
Figure 5:
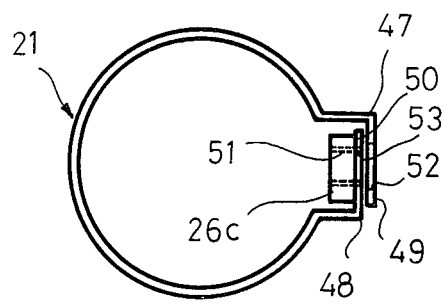
FIG. 5 is a fixing band with a nut to be incorporated in the embodiment shown in FIG. 5.

FIGS. 4 and 5 show a further single handle type modification according to the present invention, in which a pair of angle section members 47, 48 made of elastic material are oppositely provided in place of said pair of ears 23, in the manner that the vertical wall 49 of the outer member 47 overlaps the vertical wall 50 of the other member 48. Both of the walls 49, 50 are formed with a center hole, respectively, through which the threaded shank 30 is inserted. On the reverse side of the wall 50, an inside nut 26c, which may be of ordinary type, is secured by a certain desired method such as by welding or by gluing, so that its internally threaded hole 51 is aligned with the center holes 52, 53 of said two walls. Other structural parts such as a lock nut, a threaded shank with a flange, a lever handle, and the cup member, are the same as embodiments hereinbefore described. Apparently, it is not always necessary to secure the nut 26c to the reverse side of the wall 50. However, it is preferable in view of prevention of loss of the nut as well as efficiency in assembly. In use, the pair of members 47, 48 are forcibly expanded and then mounted onto a bicycle frame tube 22. In operation, when the flange 34 of the shank 30 is turned in one direction, the nut 26c is urged to advance outward when pulling the band 21 toward the outside. Thus, the desired clamping of the bicycle speed change lever device is attained.

It is obvious that the construction shown in FIG. 4 is replaceable with the construction shown in the right half of FIG. 1. In other words, the structure of FIG. 4 can be applied to a double handle type device by combining it with the structure as illustrated in the left half of FIG. 1 or the upper half of FIG. 2.

It is also obvious that the construction shown in FIG. 4 is applicable to the left half construction of FIG. 1.

It is further obvious that the construction shown in FIG. 3 is applicable to the left half construction of FIG. 1, if the fixing band is formed oppositely with two pairs of open ends. In other words, the device shown in FIG. 1 may be varied to be symmetric.

The present invention being thus described, it will be obvious that the same may be varied in many ways. Such variations are not to be regarded as a departure from the spirit and scope of the present invention, and all such modifications are intended to be inclined within the scope of the appended claims.

I claim:

1. A bicycle speed change lever device comprising
   a fixing band having at least one pair of elastically expandable open ends and are mountable onto a bicycle frame tube by expanding said open ends,
   at least one inside nut holding means formed within said open ends of said fixing band,
   at least one inside nut provided on said inside nut holding means,
   at least one cup member mounted to said fixing band and having an internal space which permits housing said inside nut holding means with said inside nut engaged therewith,
   at least one threaded shank which passes through said cup member and is engageable at its inner end with said inside nut,
   at least one lever handle movably mounted on said cup member, and
   at least one outside lock nut engageable with an outer end of said threaded shank.

2. The device, as set forth in claim 1, which includes
   one inside nut holding means which is in the form of a pair of spaced ears having an opening formed therein,
   one inside nut having a pair of small projections at opposite sides thereof,
   each of said pair of small projections being engageable in each of said openings,
   one cup member having a cylindrical portion,
   one threaded shank having a flange formed therewith,
   said cup member having a top wall formed with a passage for receiving one end of said threaded shank,
   one lever handle having an annular portion which is formed with an internal space for receiving said cylindrical portion of said cup member and is formed with a bore which couples with said flange of said threaded shank,
   said lever handle being movable about said cylindrical portion of said cup member, and
   an external diameter of said flange of said threaded shank being greater than an internal diameter of said passage of said cup member.

3. The device, as set forth in claim 2, wherein said cup member is formed with a pair of opposite internal slots therein, each of said pair of small projections of said inside nut being engageable with each of said pair of opposite internal slots.

4. The device, as set forth in claim 2, wherein said cup member is formed with at least one projection on its periphery, a plate member being disposed adjacent said annular portion of said lever handle, said plate member having an inwardly extending wall with a notch formed therein, and said notch being engageable with said projection formed with periphery of said cup member.

5. The device, as set forth in claim 2, wherein said outside lock nut is screwed onto an outer end of said threaded shank, a washer being interposed between said outside lock nut and said plate member.

6. The device, as set forth in claim 1, which includes one inside nut holding means which is in the form of a pair of angle section members, each of which has a vertical wall with a hole formed therein, each of said vertical walls being arranged in overlapping relation with each other, one inside nut with a threaded hole being positioned on an inner surface of one of said vertical walls, and said threaded hole of the inside nut being in alignment with each of the holes of said vertical walls to provide a passage for said threaded shank.

7. The device, as set forth in claim 1, which includes a fixing band having a pair of open ends, a pair of inside nut holding means, a first inside nut holding means of said pair of inside nut holding means being in the form of a pair of spaced ears having an opening formed therein, a second inside nut holding means of said pair of inside nut holding means being in the form of a channel-shaped casing having its top wall with a hole therein, a first inside nut having a pair of small projections at opposite sides thereof, said first inside nut being disposed between said pair of spaced ears, with each of said small projections engaged in each of said openings of said spaced ears, a second inside nut being provided, said second inside nut being positioned within said second inside nut holding means, a pair of cup members being mounted to opposite sides of said fixing band, respectively, a first cup member of said pair of cup members being formed with a pair of internal slots, said first cup member receiving said first inside nut holding means with said first inside nut engaged therewith, said pair of small projections of said first inside nut being engageable with said pair of internal slots of said first cup member, said second inside nut holding means being received within said second cup member, a first lever handle being movable mounted on said first cup member, a second lever handle being movably mounted on said second cup member, a first threaded shank passing through said first lever handle and said first cup member is engagement at its inner end with said first inside nut, a second threaded shank passing through said second lever handle and said second cup member in engagement at its inner end with said second inside nut, and a pair of outside lock nuts being engaged with each outer end of said first and second threaded shanks, respectively.

8. The device, as set forth in claim 7, wherein a fixing band has two pairs of open ends oppositely formed therewith, said second inside nut holding means being in the same form as said first inside nut holding means, and said second inside nut being in the same form as said first inside nut.

9. The device, as set forth in claim 7, wherein said first inside nut holding means is in the form of a pair of angle section members, each of which has a vertical wall with a hole therein, each of said vertical walls being arranged in overlapping relation with each other, one inside nut with a threaded hole being positioned on an inner surface of one of said vertical walls, and said threaded hole of the inside nut being in alignment with each of the holes of said vertical walls to provide a passage for said threaded shank.

10. The device, as set forth in claim 7, wherein said second inside nut holding means is in the form of a pair of angle section members, each of which has a vertical wall with a hole therein, each of said vertical walls being arranged in overlapping relation with each other, one inside nut with a threaded hole being positioned on an inner surface of one of said vertical walls, and said threaded hole of the inside nut being in alignment with each of the holes of said vertical walls to provide a passage for said threaded shank.

11. The device, as set forth in claim 7, wherein both of said first and second inside nut holding means are in the form of a pair of angle section members, each of said pair of angle section members having a vertical wall with a hole therein, each of said vertical walls being arranged in overlapping relation with each other, a pair of inside nuts with a threaded hole being provided, each of said pair of inside nuts being positioned on an inner surface of one of said vertical walls of each of said first and second inside nut holding means, respectively.

* * * * *